United States Patent Office 3,776,914
Patented Dec. 4, 1973

3,776,914
5-PHENYLBENZOMORPHAN DERIVATIVES
AND SALTS THEREOF
Toshio Atsumi, Kenji Kobayashi, and Yoshiaki Takebayashi, Takarazuka, and Hisao Yamamoto, Nishinomiya, Japan, assignors to Sumitomo Chemical Company, Limited, Osaka, Japan
No Drawing. Filed Jan. 25, 1971, Ser. No. 109,621
Claims priority, application Japan, Jan. 27, 1970, 45/7,584; Jan. 28, 1970, 45/7,894
Int. Cl. C07d 39/00
U.S. Cl. 260—293.54     8 Claims

ABSTRACT OF THE DISCLOSURE

Benzomorphan derivatives of the formula,

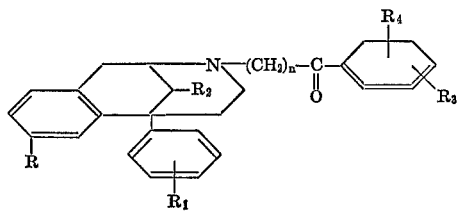

wherein R is a hydrogen atom, a hydroxyl group, or a $C_1$–$C_3$ alkoxy group; $R_1$ is a hydrogen atom, a halogen atom, a $C_1$–$C_3$ alkyl group, a $C_1$–$C_3$ alkoxy group, a hydroxyl group, a trifluoromethyl group, an amino group, a $C_1$–$C_3$ alkylthio group, a nitro group or an alkanoyloxy group; $R_2$ is a hydrogen atom or a $C_1$–$C_3$ alkyl group; $R_3$ is a hydrogen atom, a halogen atom, a $C_1$–$C_3$ alkyl group, a $C_1$–$C_3$ alkoxy group, a $C_1$–$C_3$ alkylthio group, a nitro group, a trifluoromethyl group, an amino group or a hydroxyl group; $R_4$ is a hydrogen atom, a $C_1$–$C_3$ alkoxy group, a halogen atom or a $C_1$–$C_3$ alkyl group; and $n$ is an integer of 2–4, which are useful as non-addicted analgesics and pain-relieving agents with calming effects. These benzomorphan derivatives are prepared by reacting a 6,7-benzomorphan derivative of the formula,

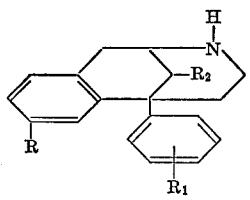

wherein R, $R_1$ and $R_2$ are as defined above, with a halogen derivative of the formula,

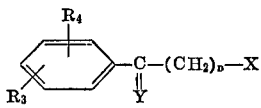

wherein $R_3$, $R_4$ and $n$ are as defined above; X is a halogen atom; and Y is an oxygen atom or an ethylenedioxy group, and further, in the case of Y=ethylenedioxy group, by hydrolyzing the resulting ethylenedioxy derivative of the formula,

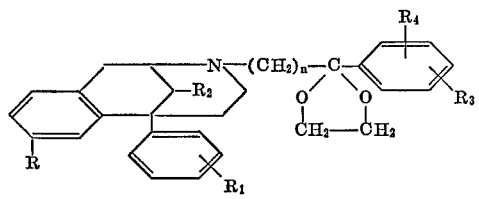

wherein R, $R_1$, $R_2$, $R_3$, $R_4$ and $n$ are as defined above.

The present invention relates to novel 6,7-benzomorphan derivatives and their salts and production thereof which are useful as non-addicted analgesics and pain-relieving agents with calming effects.

Hitherto, many benzomorphan derivatives have been studied for developing new analgesics (see, for example, Belg. Pat. 611,000 or "Chemistry of the Opium Alkaloids," U.S. Public Health Reports, Suppl. No. 103, Washington (1932)), but almost all of them produce addiction and other morphine-like side effects besides analgesic activity. These analgesics always produce significant physical dependency by administrating orally or subcutaneously. To our surprise, however, the present products do not show any drug dependency in animal tests.

One object of the present invention is to provide these novel benzomorphan derivatives which are useful as non-addicted analgesics.

Another object of the present invention is to provide a process for producing these useful benzomorphan derivatives.

A further object of the present invention is to provide a novel pharmaceutical composition containing these useful benzomorphan derivatives.

Other objects and advantages of the present invention will be apparent from the following description.

In order to accomplish these objects, the present invention provides novel benzomorphan derivatives of the formula,

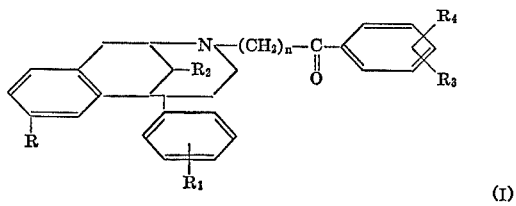

(I)

wherein R is a hydrogen atom, a hydroxyl group, or a $C_1$–$C_3$ alkoxy group; $R_1$ is a hydrogen atom, a halogen atom, a $C_1$–$C_3$ alkyl group, a $C_1$–$C_3$ alkoxy group, a hydroxyl group, a trifluoromethyl group, an amino group, a $C_1$–$C_3$ alkylthio group, a nitro group or an alkanoyloxy group; $R_2$ is a hydrogen atom or a $C_1$–$C_3$ alkyl group; $R_3$ is a hydrogen atom, a halogen atom, a $C_1$–$C_3$ alkyl group, a $C_1$–$C_3$ alkoxy group, a $C_1$–$C_3$ alkylthio group, a nitro group, a trifluoromethyl group, an amino group or a hydroxyl group; $R_4$ is a hydrogen atom, a $C_1$–$C_3$ alkoxy group, a halogen atom or a $C_1$–$C_3$ alkyl group; and $n$ is an integer of 2–4.

The present invention further provides a process for producing benzomorphan derivatives of the Formula I which comprises hydrolyzing an ethylenedioxy derivative of the formula,

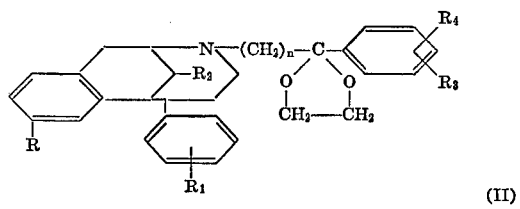

(II)

wherein R, $R_1$, $R_2$, $R_3$, $R_4$ and $n$ are as defined above.

The present invention furthermore provides a process for producing benzomorphan derivatives of the Formula I, which comprises reacting a 6,7-benzomorphan derivative of the formula,

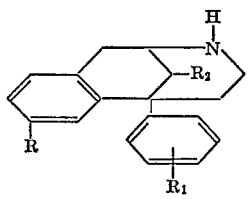

(III)

wherein R, $R_1$ and $R_2$ are as defined above, with a reactive halide of the formula,

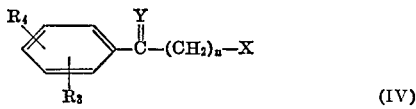

(IV)

wherein $R_3$, $R_4$ and $n$ are as defined above; X is a halogen atom; and Y is an oxygen atom or an ethylenedioxy group, and further, in the case of Y=ethylenedioxy, hydrolyzing the resulting ethylenedioxy derivative of the Formula II.

The present invention still further provides a novel pharmaceutical composition consisting of an effective amount of a benzomorphan derivative of the Formula I as active ingredient and pharmaceutically acceptable carrier or diluent.

The starting materials of this invention, 6,7-benzomorphan derivatives, are prepared from corresponding known 2-methyl-5-phenyl-6,7-benzomorphan derivatives by an usual procedure.

The reaction of a 6,7-benzomorphan derivative (III) with a reactive halide (IV) is usually accomplished in an organic inert solvent such as, for example, n-hexane, benzene, toluene, xylene, chloroform, dimethylformamide, methanol, ethanol, isopropanol, and the like. The reaction is preferably carried out in the presence of a base such as, for example, sodium carbonate, potassium carbonate, sodium bicarbonate, potassium bicarbonate, sodium hydroxide, potassium hydroxide, sodium amide, sodium hydride, pyridine, triethylamine and the like. The reaction smoothly proceeds at a temperature of 20° to 200° C., preferably 60° to 150° C. The reaction product may be readily recovered from the reaction mixture by filtrating after concentration of the solvent or by adding water or other suitable solvent in which the aimed product is insoluble or slightly soluble.

According to the process mentioned above, the following 6,7-benzomorphan derivatives are prepared:

2'-hydroxy-2-[4''-(p-fluorophenyl)-4''',4'''-ethylenedioxy-n-butyl]-5-phenyl-6,7-benzomorphan 2-[4''-(p-fluorophenyl)-4''',4'''-ethylenedioxy-n-butyl]-5-phenyl-6,7-benzomorphan 2'-methoxy-2-[4''-(p-fluorophenyl)-4''',4'''-ethylenedioxy-n-butyl]-5-phenyl-6,7-benzomorphan 2'-hydroxy-2-[4''-(p-fluorophenyl)-4''',4'''-ethylenedioxy-n-butyl]-5-phenyl-9-methyl-6,7-benzomorphan 2'-hydroxy-2-[4''-(p-methoxyphenyl)-4''',4'''-ethylenedioxy-n-butyl]-5-phenyl-6,7-benzomorphan 2'-hydroxy-2-[4''-3,4-dimethoxyphenyl)-4''',4'''-ethylenedioxy-n-butyl]-5-phenyl-6,7-benzomorphan 2'-hydroxy-2-(γ-benzoyl-n-propyl)-5-phenyl-6,7-benzomorphan 2'-hydroxy-2-[γ-(p-fluorophenyl)-γ,γ-ethoxyenedioxy-n-propyl]-5-phenyl-6,7-benzomorphan In the present invention, an ethylenedioxy derivative (II) mentioned above is readily converted into a desired 6,7-benzomorphan derivative (I) by hydrolyzing in the presence of an acid.

The hydrolysis of the said ethylenedioxy derivative (II) is carried out in a suitable solvent such as, for example, water, alcohol such as methanol, ethanol, n- or iso-propanol, n-butanol and the like, at a temperature within a range of room temperature to the boiling point of the solvent used. In this reaction a catalytic amount of acid has to be employed. Examples of acids include mineral acids such as hydrochloric acid, sulfuric acid or phosphoric acid, and organic acids such as acetic acid or the like. The reaction is usually completed after 0.5 to 2 hours.

The 6,7-benzomorphan derivative (I) in which $R_2$ is a $C_1$–$C_3$ alkyl group have two stereo isomers, that is, cis-6,7-benzomorphan derivative (I) ($R_2$ is α-configuration) and trans-compound ($R_2$ is β-configuration).

Furthermore, each of these isomers has asymmetric carbon atoms, so that there are obtained four different kinds of optical active 6,7-benzomorphan derivatives (I), i.e. (+)-cis, (−)-cis, (+)-trans, (−)-trans isomers, by a conventional optical resolution method.

The thus prepared 6,7-benzomorphan derivative (I) may be converted into its acid-addition salt by conventional procedures, for example, by treating it with a corresponding acid such as hydrochloric acid, maleic acid, citric acid, tartaric acid, lactic acid, acetic acid, gluconic acid or the like in water or a conventional inert organic solvent such as methanol, ethanol or the like. According to the process of the present invention, there are produced such 6,7-benzomorphan derivatives as shown below.

2'-hydroxy-2-[γ-(p-fluorobenzoyl)-n-propyl]-5-phenyl-6,7-benzomorphan 2-(γ-benzoyl-n-propyl)-5-phenyl-6,7-benzomorphan 2'-methoxy-2-[γ-(p-fluorobenzoyl)-n-propyl]-5-phenyl-6,7-benzomorphan 2'-hydroxy-2-[γ-(p-fluorobenzoyl)-n-propyl]-5-phenyl-9-methyl-6,7-benzomorphan 2'-hydroxy-2-[γ-(p-methoxybenzoyl)-n-propyl]-5-phenyl-6,7-benzomorphan 2'-hydroxy-2-[γ-(3,4-dimethoxybenzoyl)-n-propyl]-5-phenyl-6,7-benzomorphan 2'-hydroxy-2-(γ-benzoyl-n-propyl)-5-phenyl-6,7-benzomorphan 2'-hydroxy-2-[β-(p-fluorobenzoyl)-ethyl]-5-phenyl-6,7-benzomorphan and their hydrochloric acid salts, lactic acid salts, maleic acid salts, citric acid salts, tartaric acid salts and the like.

The present 6,7-benzomorphan derivatives (I), for example, 2'-hydroxy-2-[γ-(p - fluorobenzoyl)-n-propyl]-5-phenyl-6,7-benzomorphan, 2'-hydroxy-2-(γ - benzoyl-n-propyl)-5-phenyl-6,7-benzomorphan, and 2-[γ-(p-fluorobenzoyl)-n-propyl]-5-phenyl - 6,7 - benzomorphan have shown non-narcotic analgesic activity in mice, rats and other animals in spite of narcotic product-like structure. In a chronic test, these compounds do not produce any physical dependency in experimental animals.

Furthermore, the present 6,7-benzomorphan derivatives (I) show moderate or potent analgesic activity in a writhing test, and some of them have equal or more potent analgesic activity in comparison with those of the most excellent commercial product, 2'-hydroxy-2-(3-methyl-2-butenyl)-5,9-dimethyl-6,7-benzomorphan (pentazocine).

$ED_{50}$ was calculated according to the Litchfield-Wilcoxon's method.

TABLE 1

Effect in a writhing test
($ED_{50}$) (mg./kg., s.c.)

| Compound: | |
|---|---|
| 2' - hydroxy - 2 - [γ - (p - fluorobenzoyl - n-propyl]-5-phenyl-6,7-benzomorphan | 10.2 |
| 2' - hydroxy - 2 - [β - (p - fluorobenzoyl)-ethyl]-5-phenyl-6,7-benzomorphan | 17.0 |
| 2' - hydroxy - 2 - (γ - benzoyl - n - propyl) - 5-phenyl-6,7-benzomorphan | 15.0 |
| 2 - [γ - (p - fluorobenzoyl) - n - propyl] - 5-phenyl-6,7-benzomorphan hydrochloride | 16.2 |
| 2' - hydroxy - 2 - [γ - (p - methoxy benzoyl)-n-propyl]-5-phenyl-6,7-benzomorphan | 7.5 |
| 2' - hydroxy - 2 - (3 - methyl - 2 - butenyl) - 5,9-dimethyl-6,7-benzomorphan (Pentazocine) | 17.3 |

Furthermore, these compounds showed effective results not only in this writhing test, but also in other analgesic tests, for example, a hot plate test, or Haffner method test. Moreover, the present compounds have a moderate calming effect, which effect sometimes boosts the analygesic effect. Moreover, these present compounds have not any unfavorable side effects, for example vomitting, exciting effect, constipation, allergic reactions, respiratory depression, etc., unlike other morphine and benzomorphan analgesics.

The compounds can be prepared for use by dissolving under sterile conditions a salt form of the compounds in water (or an equivalent amount of a nontoxic acid if the free base is used) or in a physiologically compatible aqueous medium such as saline, and stored in ampoules for use by injection.

Alternatively, the compounds can be incorporated in unit dosage (1–15 mg.) form as tablets or capsules for oral administration either alone or in combination with suitable adjuvants such as calcium carbonate, starch, lactose, talc, magnesium stearate, gum acacia, and the like.

The following exmples are representative of the methods of production of the compounds. Modifications of these procedures will be obvious to those skilled in the art and these examples are not to be construed as limiting the scope of this invention.

EXAMPLE 1

2'-hydroxy-2-[γ-p-fluorobenzyl)-n-propyl]-5-phenyl-6,7-benzomorphan (a) 2'-hydroxy-2-[4''-(p-fluorophenyl)-4'',4''-ethylenedioxy-n-butyl]-5-phenyl-6,7-benzomorphan.—To a mixture of 1.48 g. of 2'-hydroxy-5-phenyl-6,7-benzomorphan, 0.675 g. of sodium bicarbonate and 20 ml. of dimethylformamide is added 1.43 g. of 4-(p-fluorophenyl)-4,4-ethylenedioxy-1-chlorobutane. The resultant mixture is stirred at 120°–150° C. for 3 hours. The solvent is removed under reduced pressure. To the residue is added water. The reaction mixture is extracted with ether. The ether extracts are washed with water saturated with sodium chloride, dried over anhydrous sodium sulfate, and filtered. The filtrate is concentrated to dryness to give 2'-hydroxy-2-[4''-(p-fluorophenyl)-4'',4''-ethylenedioxy - n-butyl]-5-phenyl-6,7-benzomorphan, as a viscous brown liquid.

IR $\mu_{\text{liquid}}^{\text{cm.}^{-1}}$: 1600, 1580, 1500, 838, 817, 758, 700

(b) 2' - hydroxy - 2 - [γ - (p - fluorobenzoyl) - n - propyl]-5-phenyl-6,7-benzomorphan.—A mixture of 2.0 g. of 2' - hydroxy - 2-[4''-(p-fluorophenyl)-4'',4''-ethylenedioxy-n-butyl]-5-phenyl-6,7-benzomorphan, 20 ml. of methanol, 10 ml. of water and 1.5 ml. of concentrated hydrochloric acid is refluxed for 1 hour. After the reaction mixture is concentrated under reduced pressure, the mixture is made alkaline with excess ammonia, and is extracted with chloroform. The chloroform extracts are washed with water, dried over anhydrous sodium sulfate, and filtered. The filtrate is concentrated to dryness to give 1.45 g. of the crude product. The crude product is passed through a silica gel column. White crystals that are obtained from an ethyl acetate fraction are recrystallized from ethyl acetate to give 2'-hydroxy-2-[γ-(p-fluorobenzoyl)-n-propyl]-5-phenyl - 6,7 - benzomorphan, M.P.: 170°–173° C.

Elementary analysis.—Calcd. for $C_{28}H_{28}FNO_2$ (percent): C, 78.30; H, 6.57; N, 3.26. Found (percent): C, 78.07; H, 6.48; N, 3.16.

According to the procedure of Example 1, the next compounds are obtained as a viscous liquid.

2'-hydroxy-2-[β-(p-fluorobenzoyl)-ethyl]-5-phenyl-6,7-benzomorphan

IR $\mu_{\text{liquid}}^{\text{cm.}^{-1}}$ 2600 (broad), 1682, 1605, 1585, 1500

2'-hydroxy-2 [γ-(p-methoxybenzoyl)-n-propyl]-5-phenyl-6,7-benzomorphan

IR $\mu_{\text{liquid}}^{\text{cm.}^{-1}}$ 2600 (broad), 1690, 1600

2'-hydroxy-2-(γ-benzoyl-n-propyl)-5-phenyl-6,7-benzomorphan

IR $\mu_{\text{liquid}}^{\text{cm.}^{-1}}$ 2600 (broad), 1685, 1600, 1500

2-[γ-(p-fluorobenzoyl)-n-propyl]-5-phenyl-6,7-benzomorphan

IR $\mu_{\text{liquid}}^{\text{cm.}^{-1}}$ 1688, 1600, 1500, 1460, 1380

What is claimed is:

1. A benzomorphan derivative of the formula,

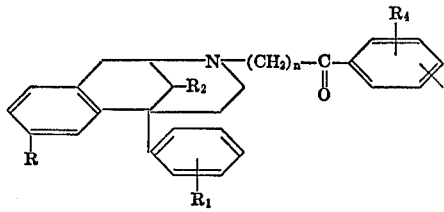

(I)

wherein R is a hydrogen atom, a hydroxyl group or a $C_1$–$C_3$ alkoxy group; $R_1$ is a hydrogen atom, a halogen atom, a $C_1$–$C_3$ alkyl group, a $C_1$–$C_3$ alkoxy group, a hydroxyl group, a trifluoromethyl group, an amino group, a $C_1$–$C_3$ alkylthio group, a nitro group or a lower alkanoyloxy group; $R_2$ is a hydrogen atom or a $C_1$–$C_3$ alkyl group; $R_3$ is a hydrogen atom, a halogen atom, a $C_1$–$C_3$ alkyl group, a $C_1$–$C_3$ alkoxy group, a $C_1$–$C_3$ alkylthio group, a nitro group, a trifluoromethyl group, an amino group or a hydroxyl group; $R_4$ is a hydrogen atom, a $C_1$–$C_3$ alkoxy group, a halogen atom or a $C_1$–$C_3$ alkyl group; and n is an integer of 2–4, and non-toxic pharmaceutically acceptable acid-addition salts thereof.

2. A benzomorphan derivative of the formula,

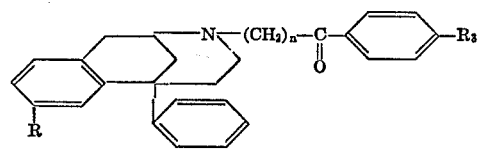

(I')

wherein R is a hydrogen atom, a hydroxyl group or a $C_1$–$C_3$ alkoxy group; $R_3$ is a hydrogen atom, a fluorine atom or a methoxy group; and n is an integer of 2 or 3, and non-toxic pharmaceutically acceptable acid-addition salts thereof.

3. 2' - hydroxy - 2 - [γ-(p-fluorobenzoyl)-n-propyl]-5-phenyl-6,7-benzomorphan.

4. 2' - hydroxy - 2 - [γ-(p-methoxybenzoyl)-n-propyl]-5-phenyl-6,7-benzomorphan.

5. 2' - hydroxy - 2 - γ-benzoyl-n-propyl)-5-phenyl-6,7-benzomorphan.

6. 2 - [2 - (p-fluorobenzoyl) - n - propyl]-5-phenyl-6,7-benzomorphan.

7. 2' - hydroxy - 2 - [β-(p-fluorobenzoyl)-ethyl]-5-phenyl-6,7-benzomorphan.

8. A novel compound of the formula.

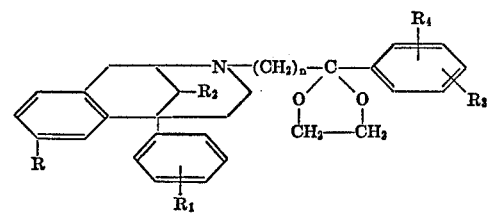

(II)

wherein R, $R_1$, $R_2$, $R_3$, $R_4$ and n are as defined in claim 1.

(References on following page)

References Cited

UNITED STATES PATENTS

| | | | |
|---|---|---|---|
| 3,320,265 | 5/1967 | Clarke | 260—294.7 |
| 3,417,094 | 12/1968 | Dexter | 260—294.7 |
| 3,074,952 | 1/1963 | Casy et al. | 260—293.4 |
| 3,004,977 | 10/1961 | Janssen | 260—294.3 |
| 3,080,372 | 3/1963 | Janssen | 260—294.7 |
| 3,438,991 | 4/1969 | Janssen | 260—294.7 |
| 3,462,444 | 8/1969 | Beckett et al. | 260—294.7 |
| 3,687,937 | 8/1972 | Wiesner et al. | 260—239.3 T |

HENRY R. JILES, Primary Examiner

G. T. TODD, Assistant Examiner

U.S. Cl. X.R.

260—999, DIG. 13